(12) United States Patent
Macias et al.

(10) Patent No.: US 7,502,831 B1
(45) Date of Patent: Mar. 10, 2009

(54) SYSTEM AND METHOD OF SENDING AND RECEIVING CATEGORIZED MESSAGES IN INSTANT MESSAGING ENVIRONMENT

(75) Inventors: Mike V. Macias, Round Rock, TX (US); Salil Pradeep Gandhi, Pune (IN); Saidas Tukaram Kottawar, Hingoli (IN); Dhaval K. Shah, Nadiad (IN); Sandip Dnyaneshwar Mahajan, Nagpur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/045,415

(22) Filed: Mar. 10, 2008

(51) Int. Cl.
*G06F 15/16* (2006.01)

(52) U.S. Cl. .................... 709/206; 709/204; 709/205; 370/360; 715/751; 715/752; 715/756; 715/758

(58) Field of Classification Search .......... 709/204–206; 707/1, 10; 370/260; 715/733–759, 763
See application file for complete search history.

(56) References Cited

U.S. PATENT DOCUMENTS

| | | | | |
|---|---|---|---|---|
| 6,393,460 B1 * | 5/2002 | Gruen et al. | ................. | 709/204 |
| 7,185,285 B2 * | 2/2007 | Van Dok et al. | ............. | 715/753 |
| 7,313,825 B2 * | 12/2007 | Redlich et al. | ................. | 726/27 |
| 2002/0188681 A1 * | 12/2002 | Gruen et al. | ................. | 709/204 |
| 2003/0210265 A1 * | 11/2003 | Haimberg | .................... | 345/758 |
| 2004/0019650 A1 * | 1/2004 | Auvenshine | ................. | 709/206 |
| 2004/0148346 A1 * | 7/2004 | Weaver et al. | ............... | 709/204 |
| 2005/0064852 A1 | 3/2005 | Baldursson | | |
| 2005/0262199 A1 | 11/2005 | Chen et al. | | |
| 2006/0018447 A1 | 1/2006 | Jacovi et al. | | |
| 2006/0274060 A1 | 12/2006 | Ni et al. | | |
| 2007/0245249 A1 * | 10/2007 | Weisberg | ..................... | 715/758 |
| 2008/0028026 A1 * | 1/2008 | Chen et al. | .................. | 709/206 |
| 2008/0086379 A1 * | 4/2008 | Dion et al. | .................... | 705/14 |
| 2008/0098005 A1 * | 4/2008 | Goradia | ....................... | 707/10 |

FOREIGN PATENT DOCUMENTS

| | | | |
|---|---|---|---|
| JP | 2002351806 A | * | 12/2002 |
| WO | WO2004049097 A2 | | 6/2004 |
| WO | WO2007035514 A2 | | 3/2007 |

OTHER PUBLICATIONS

John A. Gliedman "Minimize corporate instant messaging risks" http://www.computerworld.com/securitytopics/security/story/0,10801,99052,00.html?source=x73.*

* cited by examiner

*Primary Examiner*—Thu Ha T Nguyen
(74) *Attorney, Agent, or Firm*—MaxvalueIP, LLC

(57) ABSTRACT

An embodiment provides a flexible way to categorize instant messages (IM) or instant data by segmenting them. The default category would be viewable and/or readable as currently is with no change. However, those categories which are categorized as CONFIDENTIAL and/or PERSONAL would be displayed in a hidden form. The invention is demonstrated using a CONFIDENTIAL category; however, the invention is not limited to just CONFIDENTIAL category as it can be applied to other categories as well, such as INFORMATIONAL. An embodiment of the invention allows users to view CONFIDENTIAL informational in private and data would be hidden on the receiving end until a request to unhide is made by the receiver.

1 Claim, 3 Drawing Sheets

| SEND | CANCEL | MENU |

| WITH | Sai |
|---|---|
| SUBJECT | Chat |

| User 1 (1:08 pm) | Hi, User 2! |
| User 2 (1:09 pm) | hi, sorry forgot to send you link |
| User 2 (1:09 pm) | visit: ... |
| User 2 (1:10 pm) | hey, do you know? |
| | CONFIDENTIAL ⁄⁄ 101 |
| User 1 (1:30 pm) | so.. how is project work going on.. |
| User 2 (1:30 pm) | great |
| User 2 (1:30 pm) | please send as conf :) |
| User 1 (1:34 pm) | ok          301 |
| | CONFIDENTIAL ⁄⁄ |

| PLAY | PAUSE | STOP |

Type your text: |

FIG 3

SYSTEM AND METHOD OF SENDING AND RECEIVING CATEGORIZED MESSAGES IN INSTANT MESSAGING ENVIRONMENT

BACKGROUND OF THE INVENTION

The use of "instant messaging" (IM) systems is prevalent in the industry today. It has begun to expand as a form of electronic communication in recent years. Although instant messaging was initially a tool in the chat rooms specifically built for entertainment purposes, its application is now spanning the internal communications of corporations. Having all advantages of email messaging, namely being non-intrusive, it does not have many of the disadvantages of the email communication, namely its offline nature. It can easily be recorded and archived, using not a large memory space. Instant messaging technique, to be used as a serious method of communication, however, needs to be improved. For example, the issue of "privacy" in terms of the text that is received via an instant message from another person has not been adequately addressed.

In an IM session, the text typically comes in as "clear text" and is readily viewable and/or readable by anyone near one's computer. This could potentially create problems, if the nature of the text being received is confidential and/or personal in nature, and onlookers are able to read such text inadvertently. Furthermore, often new users enter the "chat room" after the conversation has started. It is a difficult job for the newcomer to figure out what the subject is and extract the gist of the conversation quickly. In addition, all of the chat room participants in a normal chat room have the same type and level of access to the text in the chat room. This also can be potentially problematic. With the current system, upon entrance of a specific user who should not have access to such data, the chat room has to be stopped or all previous data has to be deleted.

SUMMARY OF THE INVENTION

An embodiment of this invention provides a flexible way to categorize by segmenting IM data. The default category would be viewable and/or readable as it is today with no change. However, those categories (segments) that are categorized as CONFIDENTIAL and/or personal in nature would be displayed in a hidden form. An embodiment of the invention is demonstrated using a CONFIDENTIAL category; however, the invention is not limited to just CONFIDENTIAL category as it can be applied to other categories too, such as INFORMATIONAL.

An embodiment of the invention provides the users the capability to view CONFIDENTIAL informational in private and have the data be hidden on the receiving end. An embodiment allows segmentation of data to avoid clutter in the IM window and enhances readability. In addition to having the confidential information be protected from onlookers.

BRIEF DESCRIPTION OF THE DRAWINGS

FIG. 3 depicts the continuation of the normal chat session after the users have viewed the confidential information and collapsed the text to hide it. It also shows that the process can be repeated by entering another tag marking more confidential information.

DETAILED DESCRIPTION OF THE PREFERRED EMBODIMENTS

An embodiment of this invention provides a way for a sender of an IM to specify the category (e.g., CONFIDENTIAL) of the message text being sent. This category could be viewed as a segment of text being sent. In one embodiment, the sender specifies the start of a specific category (segment) by clicking on a special Control Key combination (e.g., Ctrl+S), or via a menu pull-down option. Likewise, a separate Control Key combination (e.g., Ctrl+C) can be used to signify the end of this category and to revert back to the normal IM text.

In one embodiment, the receiver of the IM marks the entire session as Confidential by using a checkbox provided on top of the window. So, all messages being received would be hidden under a section. The receiver would have to click on section to view the message.

In one embodiment, the sender text would include a custom marker tag that would identify the type of segmented text that is being sent. The receiver would look for this special tag, and process according to a predefined set of rules based on the category received.

For instance, if the category is that of CONFIDENTAIL, then the receiver would receive the text in a package with the title: CONFIDENTIAL. In one embodiment, other forms of display are used for the other categories. For example, special icons or images could be used, along with collapsed text, etc.

Figure 1:
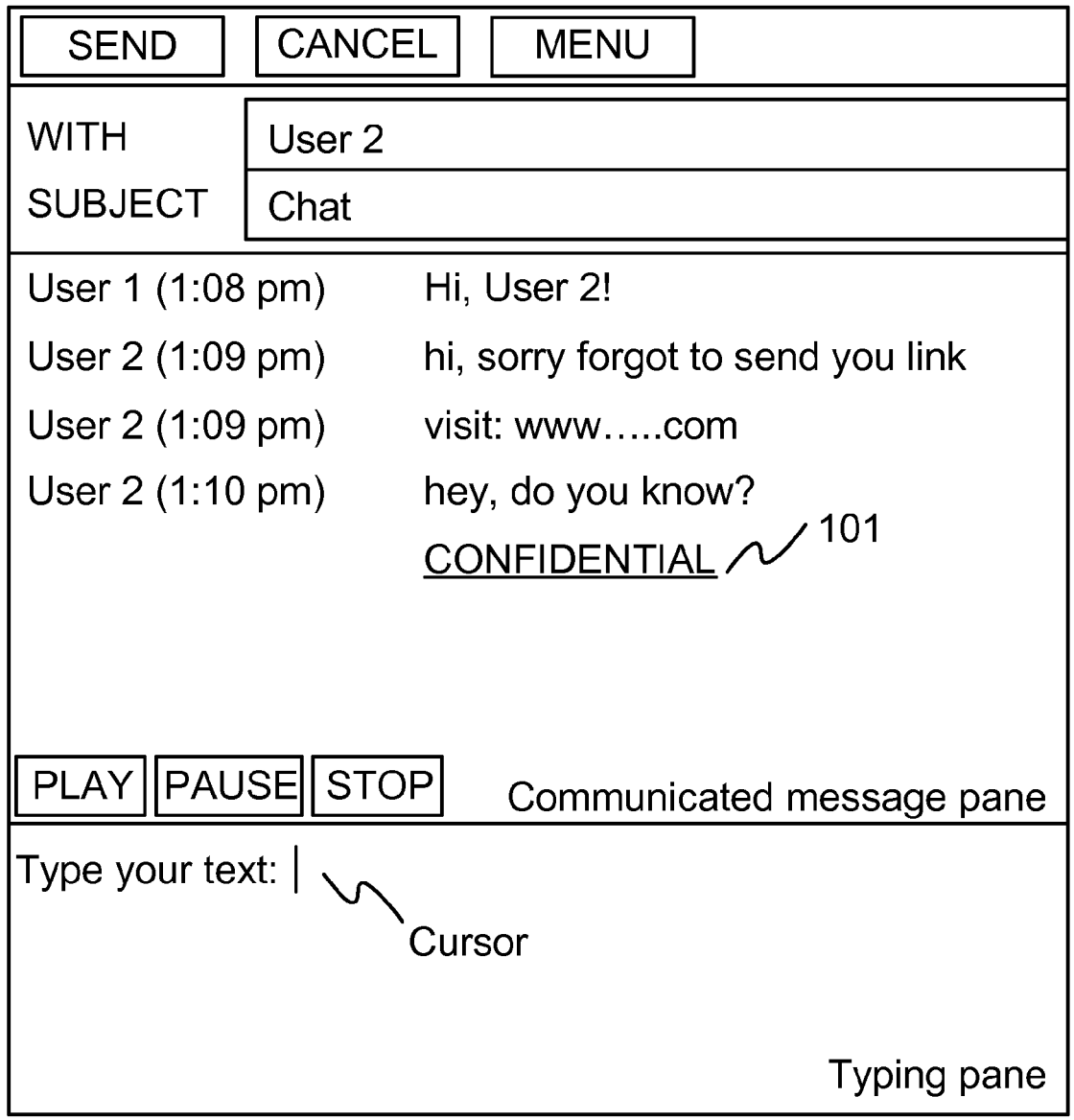
FIG. 1 is a diagram displaying a typical chat session. The user recognizes that some pieces of information are confidential and sends them accordingly.
Figure 2:
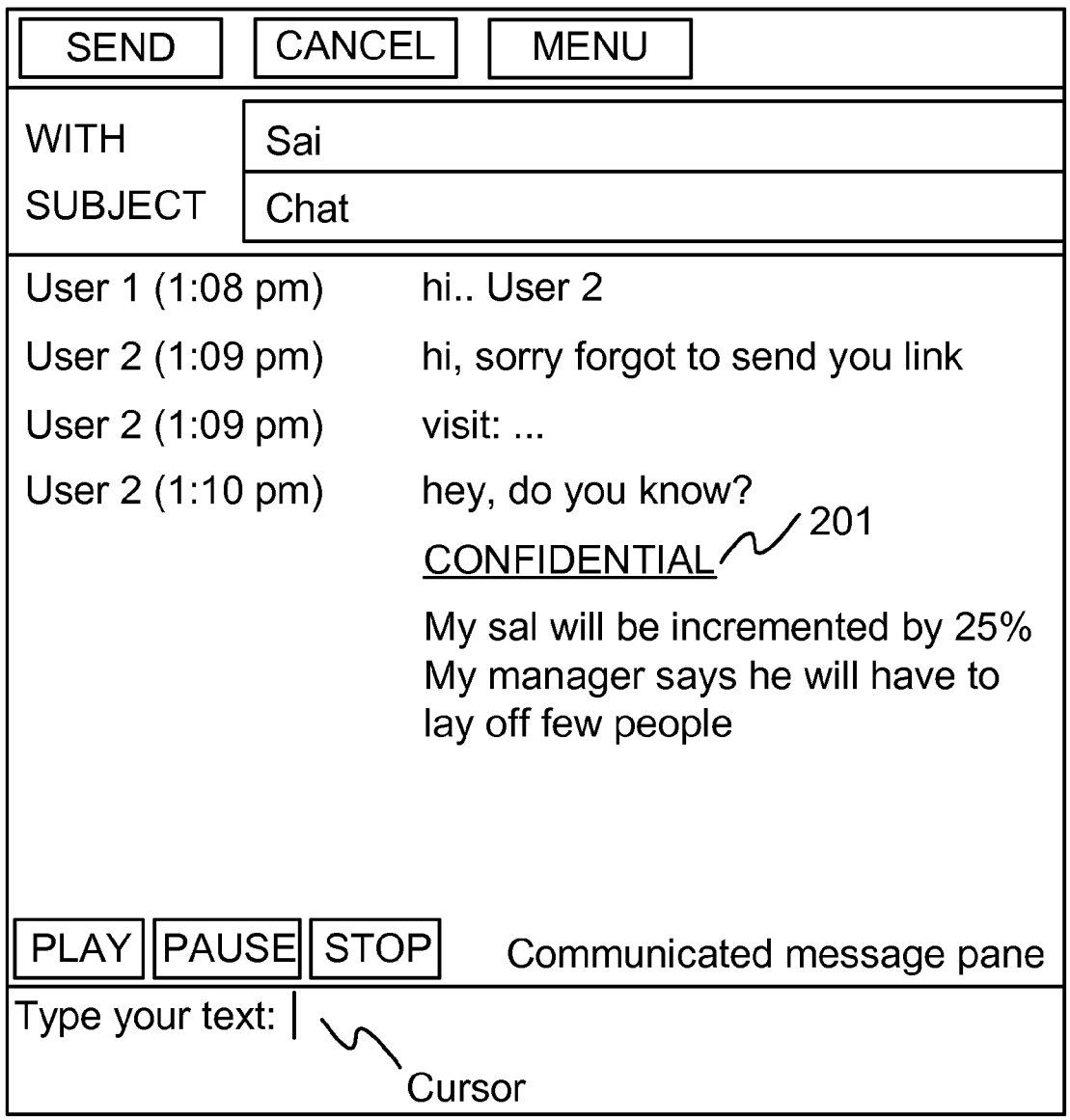
FIG. 2 illustrates the display at the receiver side. The receiver clicks on the word "CONFIDENTIAL" to expand it or un-hide the hidden text. The hidden text is un-hid by this expansion process.

Consider a scenario where two users are chatting in one embodiment: User 1 and User 2. Their normal window screen is shown in FIG. 1. Now, User 2 wishes to send a piece of confidential information to User 1, so he/she presses "CTRL+S" to start recording the confidential text. In this case, a new section will appear in a window displaying "CONFIDENTIAL" (101), informing that the confidential information can be entered prior to sending. On the receiving end, as shown in FIG. 2, the confidential data comes as pulled up into a hidden form. To view the contents, the user needs to expand (un-collapse) the section (201). After reading the message, the user can then collapse the section (201) and proceed with usual chat session during which confidential information will not be shown. Similarly, as the chat session continues, new information can be requested to be sent in a similar confidential (301) form as shown in FIG. 3.

In one embodiment, the same approach applied for the confidential data scenario above is applied for the other predefined categories (e.g., INFORMATIONAL, DFAULT). One embodiment has a unique layout/view for the various categories to minimize clutter and enhance IM text readability.

In one embodiment of the invention, the sender segments messages and associates message segments with a category using sender client user interface. The sender assigns a segment to a category by indicating the start and the end of a segment for a given category selected from a choice of categories.

Then the sender client sends the messages in the segment tagged with the category to the receiving client. Receiving client determines the category associated with the sender segment and in case receiver chooses an overriding category (via the receiving client), it associates its overriding category to the sent message. The receiving client then identifies the layout/view and rules associated with the message category and displays the sent message segment based on the corresponding layout/view directives or rules (e.g. hiding/collapsing messages tagged as CONFIDENTIAL) until the receiver displays the messages by un-hiding/expanding the message segment at the receiving client.

One embodiment of this invention is a method of sending and receiving categorized messages in an instant messaging environment. The method comprises a sender sending an instant message to a receiver using a sender client while segmenting the instant message into multiple segments and marking limits of the multiple segments. It also comprises a receiver receiving the IM using a receiving client. The sender assigns a first category from a list of predefined categories to a first segment among the multiple segments and tags the first segment with the first category from the list of predefined categories.

The receiving client identifies a layout, a view, and some or all of the rules associated with the first category, and based on these, displays the first segment. If the first category is confidential category, then the method hides, obscures, or collapses the first segment, as display default.

The method provides the receiver an option to override the assignment of the first category by the sender. In case the receiver exercises the option to override the assignment of the first category by the sender, the assignment is changed to a second category.

A system, apparatus, or device comprising one of the following items is an example of the invention: instant messaging environment, IM client, IM server, IM message, message segment, category, layout, view, rule, hiding or collapse control, display, or any software, applying the method mentioned above, for purpose of invitation or sending and receiving categorized messages in an instant messaging environment.

Any variations of the above teaching are also intended to be covered by this patent application.

The invention claimed is:

1. Method of sending and receiving categorized messages in an instant messaging environment, said method comprising:

a sender sending an instant message to a receiver;
said sender using a sender client;
said receiver using a receiving client;
said sender segmenting said instant message into multiple segments;
said sender marking limits of said multiple segments;
said sender assigning a first category from a list of predefined categories to a first segment among said multiple segments, by indicating start and end of said first segment for a given category selected from said list of predefined categories;
said sender tagging said first segment with said first category from said list of predefined categories;
said receiver identifying a layout, a view, and rules associated with said first category;
said receiver displaying said first segment, based on said layout, said view, and said rules associated with said first category;
if said first category is confidential category, then:
  hiding, obscuring, or collapsing said first segment, as display default;
  wherein a section appears in a window displaying a phrase indicating confidential information, informing that confidential data is permitted to be entered prior to sending;
  said receiver receiving said confidential data as pulled up into a hidden form:
  said receiver expanding said section to view contents;
  said receiver collapsing said section, after reading said contents:
  said receiver proceeding with chat session without displaying confidential data;
wherein said receiver has an option to override said assignment of said first category by said sender; and
in case said receiver exercises said option to override said assignment of said first category by said sender, changing said assignment to a second category.

* * * * *